United States Patent [19]

Brown

[11] Patent Number: 5,022,460
[45] Date of Patent: Jun. 11, 1991

[54] CONTROL OF STAGED HEATING AND COOLING APPARATUS BY A FOUR-WIRE THERMOSTAT

[75] Inventor: Bernard T. Brown, St. Louis County, Mo.

[73] Assignee: Emerson Electric Co., St. Louis, Mo.

[21] Appl. No.: 478,240

[22] Filed: Feb. 9, 1990

[51] Int. Cl.⁵ .................... F25B 29/00; G05D 23/00
[52] U.S. Cl. ..................................... 165/12; 165/24; 165/26; 236/1 C; 236/51
[58] Field of Search ................ 165/26, 29, 12, 24, 165/25; 236/1 C, 51

[56] References Cited

U.S. PATENT DOCUMENTS

| | | | |
|---|---|---|---|
| 3,605,877 | 9/1971 | Isaacs et al. | 165/26 |
| 3,815,668 | 6/1974 | Carlson | 165/26 |
| 3,993,120 | 11/1976 | Iberg et al. | 165/26 |
| 4,083,397 | 4/1978 | Kimpel et al. | 165/26 |
| 4,632,304 | 12/1986 | Newell, III et al. | 165/26 |
| 4,828,016 | 5/1989 | Brown et al. | 165/29 |
| 4,889,179 | 12/1989 | Merenda | 165/26 |

Primary Examiner—John K. Ford
Attorney, Agent, or Firm—Paul A. Becker, Sr.

[57] ABSTRACT

A heating and cooling apparatus wherein either or both the heating apparatus and cooling apparatus are two-stage is controlled by a thermostat through four connecting wires. A signal on one of the wires enables the functions of controlling operation of the circulator fan and controlling second-stage operation of whichever apparatus is two-stage.

6 Claims, 8 Drawing Sheets

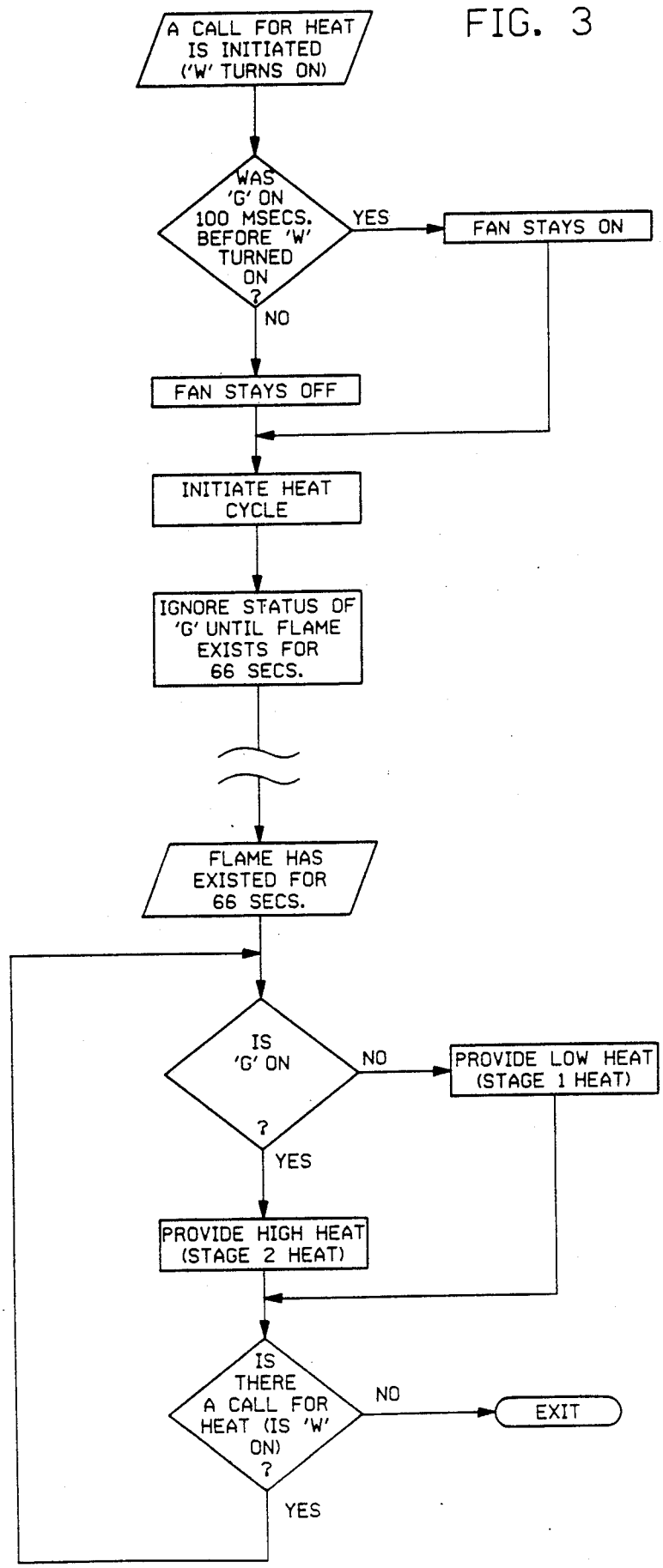

CONTROL OF STAGED HEATING AND COOLING APPARATUS BY A FOUR-WIRE THERMOSTAT

BACKGROUND OF THE INVENTION

In recent years, the construction and method of operation of heating and cooling apparatus have been significantly improved so as to effect a considerably higher degree of energy efficiency. Accordingly, it is becoming quite common to replace an existing older-vintage heating and cooling apparatus with such improved apparatus. When so replacing, it is highly desirable that no more wires, in addition to those already existing, be needed to connect the replacement heating and cooling apparatus with the controlling thermostat. Such connecting wires are generally located within partition walls so that having to add more wires can be difficult, especially in multi-story dwellings and dwellings with masonry interior walls.

When the existing heating and cooling apparatus is single-stage, that is, one-stage heating and one-stage cooling, there are at least four wires connecting the apparatus to the thermostat. One wire carries the heating signal, one wire carries the cooling signal, one wire carries the circulator fan signal, and one wire provides a common power return for circuits through the other three wires. When the replacement heating and cooling apparatus is also single-stage, the existing four wires are utilized and no additional wires are needed. However, when the existing heating and cooling apparatus is single-stage, either or both the replacement heating apparatus and the replacement cooling apparatus are two-stage and there exists only four connecting wires to the thermostat, a problem arises as to how to effectively control two-stage operation without adding an additional wire or wires. Typically, a thermostat controlling two-stage operation utilizes such an additional wire or wires to enable the thermostat to provide, through such additional wire or wires, the required signals for controlling second-stage operation.

In U.S. Pat. No. 4,425,930, an arrangement is disclosed wherein a two-stage heating apparatus is controlled by a conventional single-stage thermostat. It would appear that such an arrangement, when combined with a typical single-stage cooling apparatus, could enable control of the heating and cooling apparatus using only four connecting wires to the thermostat. In this prior art arrangement, the heating apparatus includes a timing means which establishes specific times in the heating cycle at which second-stage operation is to be effected. For example, second-stage operation is effected at the beginning of the heating cycle; after thirty to sixty seconds, the system operates at only the first stage; after eight to ten minutes, if the thermostat is still calling for heat, the system again operates at the second-stage. While such an arrangement may operate satisfactorily, it is believed that a more constant level of room temperature can be maintained if second-stage operation is controlled in a manner more dependent upon sensed room temperature.

SUMMARY OF THE INVENTION

An object of this invention is to provide for control, by a thermostat through four connecting wires, of a heating and cooling apparatus wherein either or both the heating apparatus and cooling apparatus are two-stage.

A further object of this invention is to provide for such control in a manner dependent upon sensed room temperature.

A further object of this invention is to provide for such control by utilizing the wire to one of the terminals of the thermostat for several functions.

In accordance with a first embodiment of the present invention, wherein both the heating apparatus and the cooling apparatus are two-stage and wherein the thermostat is an electronic thermostat, the wire to one of the terminals of the thermostat, identified as the G terminal, enables the functions of controlling circulator fan operation and controlling the second stage of heating and the second stage of cooling. Such functions are enabled by appropriate logic in the heating and cooling apparatus and in the thermostat.

In accordance with a second embodiment of the present invention, wherein one of the heating apparatus and cooling apparatus is two-stage and the other is single-stage and wherein the thermostat is an electronic thermostat, the wire to the G terminal enables the functions of controlling circulator fan operation and controlling the second stage of whichever apparatus is two-stage. Again, such functions are enabled by appropriate logic in the heating and cooling apparatus and in the thermostat.

In accordance with a third embodiment of the present invention, wherein the heating apparatus is two-stage and the cooling apparatus is single-stage and wherein the thermostat is an electro-mechanical thermostat, the wire to the G terminal enables the functions of controlling circulator fan operation and controlling the second stage of heating. In this embodiment, such functions are enabled by appropriate logic in the heating and cooling apparatus and by mechanical switching in the thermostat.

An additional feature of the present invention is that should the four-wire staging thermostat fail, a conventional heating and cooling thermostat normally used for controlling single-stage heating and cooling apparatus and generally readily available in the marketplace can be utilized, until the proper thermostat can be obtained and installed, so as to enable at least some amount of thermostatically-controlled heating and cooling to be provided.

The above-mentioned and other objects and features of the present invention will become apparent from the following description when read in conjunction with the accompanying drawings.

BRIEF DESCRIPTION OF THE DRAWINGS

FIG. 3 is a flow chart depicting logic programmed into and executed by a control module in the heating and cooling apparatus of FIG. 1 to effect control of two-stage heating;

DESCRIPTION OF A FIRST EMBODIMENT

Figure 1:
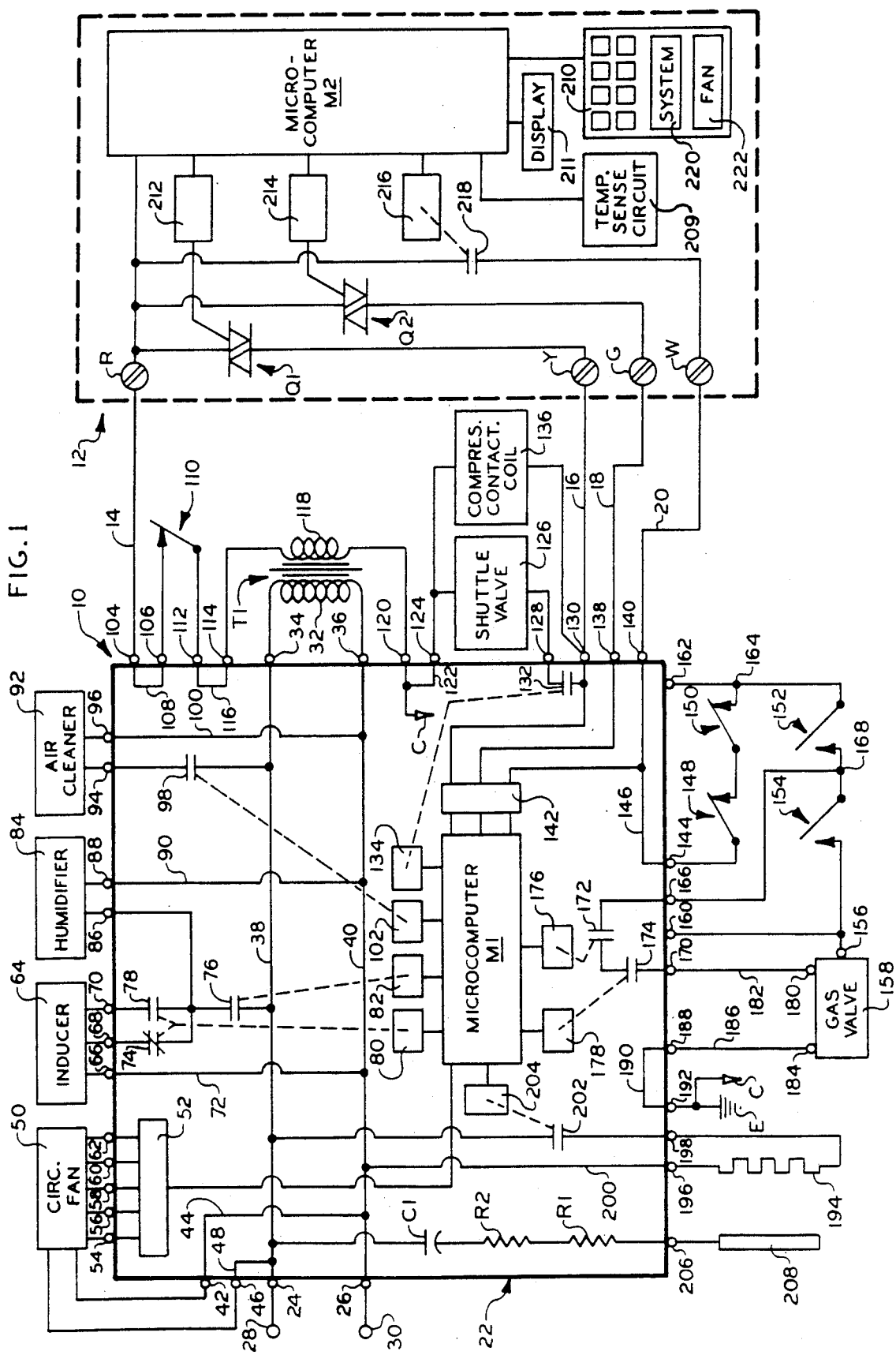
FIG. 1 is a schematic illustration, largely in block form, of a two-stage heating apparatus and a two-stage cooling apparatus connected to an electronic thermostat by four wires in accordance with the present invention.

Referring to FIG. 1, shown generally at 10 is a two-stage heating and two-stage cooling apparatus, and shown generally at 12 is an electronic thermostat. Apparatus 10, which is generally located in the basement or utility room of a dwelling, is connected to thermostat 12, which is generally located in the space whose temperature is to be controlled, by wires 14, 16, 18 and 20, which wires are generally located within partition walls (not shown) between apparatus 10 and thermostat 12.

Apparatus 10 includes a control module 22 having a plurality of terminals to which wires 14, 16, 18 and 20 and various system components are connected. Control module 22 further includes a microcomputer M1 and related circuitry for effecting control of the system components connected thereto.

Control module 22 is connected at terminals 24 and 26 to terminals 28 and 30 of a conventional 120 volt alternating current power source. The primary winding 32 of a voltage step-down transformer T1 is connected at terminals 34 and 36, terminal 34 being connected to terminal 24 by a lead 38, and terminal 36 being connected to terminal 26 by a lead 40.

A terminal 42 of control module 22 is connected by a lead 44 to lead 40, and a terminal 46 is connected by a lead 48 to lead 38. The 120 volt potential across terminals 42 and 46 is applied to a circulator fan 50 which provides for the circulation or distribution of the conditioned air through the dwelling. Fan 50 is a variable speed fan, its speed being controlled by microcomputer M1 through a drive circuit 52 which provides the proper speed-control logic to fan 50 at terminals 54, 56, 58, 60 and 62.

A two-speed inducer 64, sometimes also referred to as a purge fan or combustion air blower, is connected to terminals 66, 68 and 70 of control module 22. Terminal 66 is connected by a lead 72 to lead 40; terminal 68 is connected through a set of normally-closed relay contacts 74 and a set of normally-open relay contacts 76 to lead 38; and terminal 70 is connected through a set of normally-open relay contacts 78 and the normally-open relay contacts 76 to lead 38. Relay contacts 74 and 78 comprise a single-pole, double-throw relay whose operating coil is included in a drive circuit 80 connected to microcomputer M1; relay contacts 76 comprise a single-pole, single-throw relay whose operating coil is included in a drive circuit 82 connected to microcomputer M1. Inducer 64 is in fluid-flow communication with the combustion chamber of a furnace (not shown). When gas is flowing into the combustion chamber, inducer 64 provides the air required for developing a combustible air-gas mixture and provides a positive means for forcing the products of combustion out of the combustion chamber through the flue. Inducer 64 can also provide a purging of the combustion chamber before and after a normal burner cycle. In operation, when low speed operation of inducer 64 is desired, relay contacts 76 are closed; when high speed operation is desired, relay contacts 76 and 78 are closed.

A humidifier 84 is connected to terminals 86 and 88 of control module 22. Terminal 86 is connected through relay contacts 76 to lead 38; terminal 88 is connected by a lead 90 to lead 40.

An electrically operated air cleaner 92 is connected to terminals 94 and 96 of control module 22. Terminal 94 is connected through a set of normally-open relay contacts 98 to lead 38; terminal 96 is connected by a lead 100 to lead 40. Relay contacts 98 comprise a single-pole, single-throw relay whose operating coil is included in a drive circuit 102 connected to microcomputer M1.

Lead 14 from terminal R of thermostat 12 is connected to a terminal 104 of control module 22. A terminal 106 of control module 22 is internally connected by a lead 108 to terminal 104 and externally connected to the fixed contact of a normally-closed rollout switch 110. The movable switch arm of rollout switch 110 is connected to a terminal 112 of control module 22. Rollout switch 110 is located in the vestibule portion of a furnace (not shown), and is effective to open its contacts when impinged by flame.

A terminal 114 of control module 22 is internally connected by a lead 116 to terminal 112 and externally connected to one side of the secondary winding 118 of transformer T1. The other side of transformer T1 is connected to a terminal 120 of control module 22. Terminal 120 is connected internally to chassis common C and by an internal lead 122 to a terminal 124.

A shuttle valve 126 is connected between terminal 124 and a terminal 128 of control module 22. Terminal 128 is internally connected to a terminal 130 through a set of normally-open relay contacts 132. Relay contacts 132 comprise a single-pole, single-throw relay whose operating coil is included in a drive circuit 134 connected to microcomputer M1. In operation, shuttle valve 126, when energized, loads the compressor (not shown) so as to cause increased cooling. A compressor contactor coil 136, for effecting energizing of the compressor, is connected between terminals 124 and 130.

Lead 16 from terminal Y of thermostat 12 is connected to terminal 130 of control module 22. Lead 18 from terminal G of thermostat 12 is connected to a terminal 138 of control module 22, and lead 20 from terminal W of thermostat 12 is connected to a terminal 140 of control module 22. Terminals 130, 138 and 140 are connected through a buffer 142 to microcomputer M1.

A terminal 144 of control module 22 is internally connected by a lead 146 to terminal 140 and externally connected through a normally-closed high-limit switch 148, a normally-closed auxiliary limit switch 150, a normally-open low-pressure switch 152, and a normally-open high-pressure switch 154 to a terminal 156 of a two-stage gas valve 158 and to a terminal 160 of control module 22. A terminal 162 of control module 22 is connected to a junction 164 between auxiliary limit switch 150 and low-pressure switch 152. A terminal 166 of control module 22 is connected to a junction 168 between pressure switches 152 and 154. Auxiliary limit switch 150 is located on inducer 64. It is adapted to open its contacts if the temperature on inducer 64 reaches a value beyond which the plastic housing of inducer 64 might be damaged. High-limit switch 148 is located in the plenum of the furnace. It is adapted to open its contacts if the temperature in the plenum reaches a value beyond which the furnace is not designed to operate safely. Low-pressure switch 152 and high-pressure switch 154 are located so as to be responsive to the rate of fluid flow effected by inducer 64. Specifically, when inducer 64 is operating at low speed, the resulting rate of fluid flow causes the contacts of low-pressure switch 152 to close; when inducer 64 is operating at high speed, the resulting rate of fluid flow causes the contacts of both switches 152 and 154 to close.

Series connected internally between terminal 166 and a terminal 170 of control module 22 are two sets of normally-open relay contacts 172 and 174. Relay contacts 172 comprise a single-pole, single-throw relay whose operating coil is included in a drive circuit 176 connected to microcomputer M1; relay contacts 174 comprise a single-pole, single-throw relay whose operating coil is included in a drive circuit 178 connected to microcomputer M1.

A terminal 180 of gas valve 158 is connected by a lead 182 to terminal 170 of control module 22. A terminal 184 of gas valve 158 is connected by a lead 186 to a terminal 188 of control module 22. Terminal 188 is internally connected by a lead 190 to a terminal 192. Terminal 192 is connected to chassis common C and earth ground E.

Gas valve 158 is adapted to provide a relatively low gas flow rate when power is provided only to its terminals 180 and 184. When power is additionally provided to its terminal 156, the biasing is changed on an internal regulator in gas valve 158 to effect an increase in the gas flow rate. Typical of such a valve is valve model 36E94-301 which is manufactured by White-Rodgers Division, Emerson Electric Co.

An igniter 194 is connected across terminals 196 and 198 of control module 22. Terminal 196 is connected by a lead 200 to lead 40; terminal 198 is connected through a set of normally-open relay contacts 202 to lead 38. Relay contacts 202 comprise a single-pole, single-throw relay whose operating coil is included in a drive circuit 204 connected to microcomputer M1.

Igniter 194 is a hot surface igniter and is located adjacent the gas burner (not shown) so as to effect ignition after it has been electrically energized for a sufficiently long time period to enable it to attain gas ignition temperature.

Connected to a terminal 206 of control module 22 is a flame probe 208. Terminal 206 is connected through resistors R1 and R2 and a capacitor C1 to lead 38. Flame probe 208 is located so as to be impinged by the burner flame (not shown) whereby it can detect the presence and absence of burner flame.

The salient features of thermostat 12 include a microcomputer M2, a temperature sense circuit 209, a keypad 210, an LCD 211 (liquid crystal display), gating circuits 212 and 214, a drive circuit 216, triacs Q1 and Q2, and a set of normally-open relay contacts 218. As shown in FIG. 1, gating circuit 212 is connected to the microcomputer M2 and to the gate terminal of triac Q1, and the main terminals of triac Q1 are connected between terminals R and Y. Gating circuit 214 is connected to microcomputer M2 and to the gate terminal of triac Q2, and the main terminals of triac Q2 are connected between terminals R and G. Drive circuit 216 is connected to microcomputer M2, and relay contacts 218 are connected between terminals R and W.

LCD 211 provides a plurality of display elements for designating time and temperature plus various other information. Temperature sense circuit 209 includes a thermistor (not shown) in circuit with an oscillator (not shown), the output frequency of which is a function of the ambient temperature sensed by the thermistor. This frequency is measured by microcomputer M2 and converted to a measurement of degrees of temperature.

Operation of thermostat 12 is controlled by a set of instructions programmed into the ROM of microcomputer M2, and by information entered into the RAM of microcomputer M2 by the user by means of keypad 210. By proper manipulation of the various keys in keypad 210, the user can establish a desired time-temperature schedule for controlling apparatus 10.

Keypad 210 also includes a system selector switch, designated at 220, which is operable to provide a HEAT mode, a COOL mode, an OFF mode and an AUTO mode. In the HEAT mode, thermostat 12 is effective to control the heating portion of apparatus 10 so as to maintain the space temperature at the selected heating set point temperature value. In the COOL mode, thermostat 12 is effective to control the cooling portion of apparatus 10 so as to maintain the space temperature at the selected cooling set point temperature value. In the OFF mode, thermostat 12 prevents energizing of both the heating and cooling portions of apparatus 10. In the AUTO mode, thermostat 12 is effective to maintain the space temperature between two user-selected set point temperature values by automatically actuating the heating portion or the cooling portion of apparatus 10, whichever is required to maintain the space temperature between the two user-selected set point temperature values.

Keypad 210 also includes a fan switch, designated at 222, which is operable to provide an AUTO mode and an ON mode. The functions effected by fan switch 222 in the AUTO and ON modes will hereinafter be described.

With system selector switch 220 in the COOL mode position, microcomputer M2 provides an enabling signal to gating circuit 212 whenever microcomputer M2 determines that cooling is required. Gating circuit 212, in turn, effects conduction of triac Q1. As will hereinafter be described in more detail, conduction of triac Q1 enables energizing of at least one stage of the cooling portion of apparatus 10.

Drive circuit 216 includes a pair of coils in a latching relay arrangement. With system selector switch 220 in the HEAT mode position, microcomputer M2 provides an enabling signal to drive circuit 216 whenever microcomputer M2 determines that heating is required. The enabling signal effects energizing of one of the latching relay coils in drive circuit 216 so as to cause relay contacts 218 to close. As will hereinafter be described in more detail, when relay contacts 218 are closed, at least one stage of the heating portion of apparatus 10 is energized. When the heating requirement is satisfied, microcomputer M2 provides an enabling signal to drive circuit 216 which effects energizing of the other of the latching relay coils so as to cause relay contacts 218 to open.

When microcomputer M2 provides an enabling signal to gating circuit 214, triac Q2 conducts. As will hereinafter be described in more detail, triac Q2 will, in accordance with logic programmed into and executed by microcomputers M1 and M2, enable circulator fan 50 to be on continuously, control the second stage of heating, or control the second stage of cooling.

Thermostat 12 is programmable by the homeowner by means of keypad 210 to provide for different set point temperatures during different time periods in a repetitive time span, the particular set point temperatures and time periods being determined by the homeowner's particular desires. Microcomputer M2 contains a temperature algorithm effective to control operation of apparatus 10 so as to maintain the controlled space at the programmed set point temperature in effect during any particular time period.

In accordance with the temperature algorithm, energizing and de-energizing of apparatus 10 is effected by the value of a parameter referred to herein as buffered temperature. Buffered temperature is a composite temperature value including an ambient temperature component provided by temperature sense circuit 209 of thermostat 12 and a demand indicator component.

The demand indicator component is a count value in an anticipation counter in the RAM of microcomputer M2, each count representing 1/16° F. In the heating mode of operation, the counter is incremented when the heating apparatus is energized and decremented when the heating apparatus is de-energized, and the count value is added to the ambient temperature to define buffered temperature. In the cooling mode, the counter is incremented when the cooling apparatus is energized and decremented when the cooling apparatus is de-energized, and the count value is subtracted from the ambient temperature to define buffered temperature. The incrementing and decrementing occur at preselected time intervals, for example, every 40 seconds.

Figure 2A:
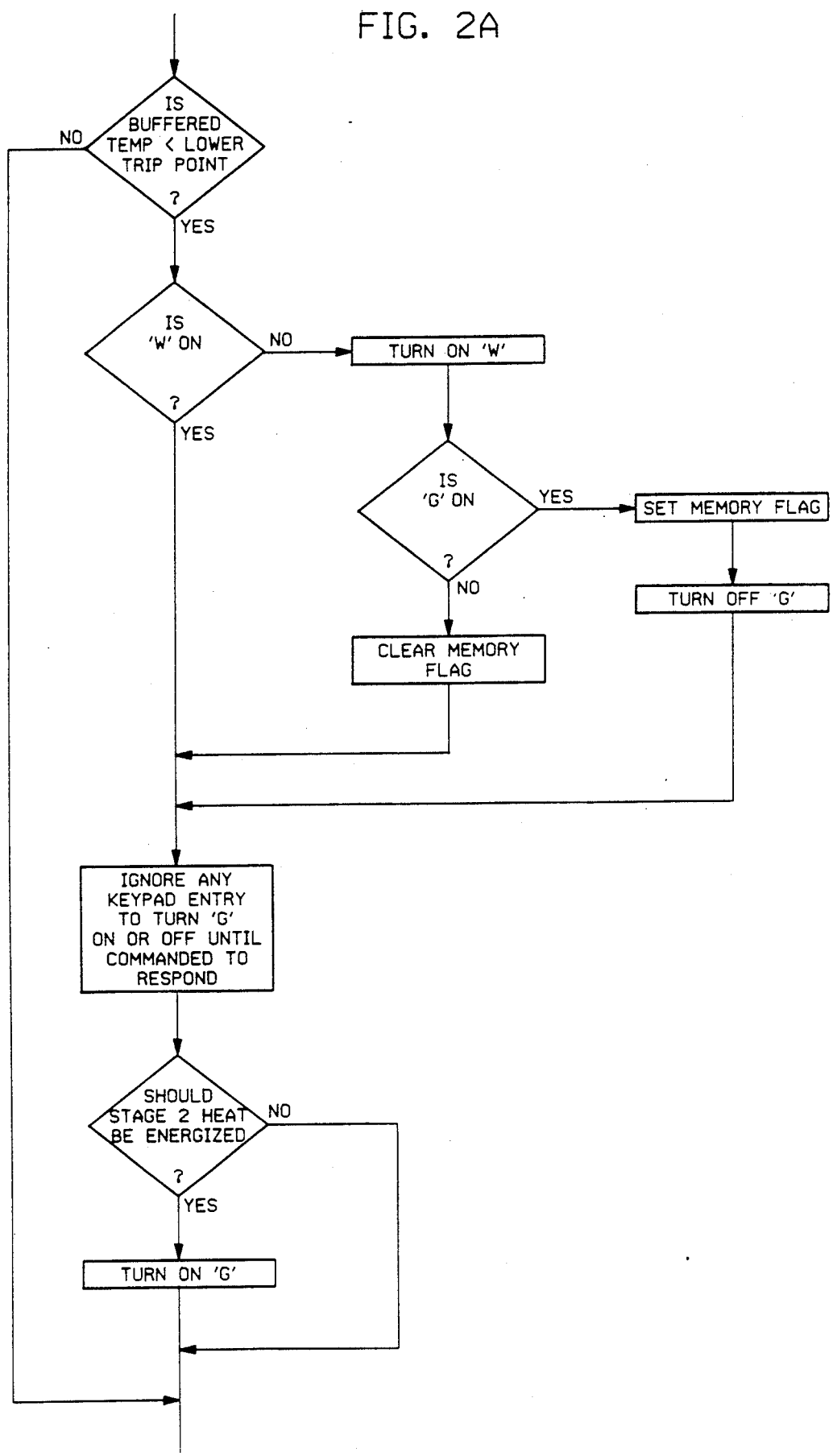
FIGS. 2A and 2B, when combined, is a flow chart depicting logic programmed into and executed by the thermostat of FIG. 1 to effect control of two-stage heating.
Figure 2B:
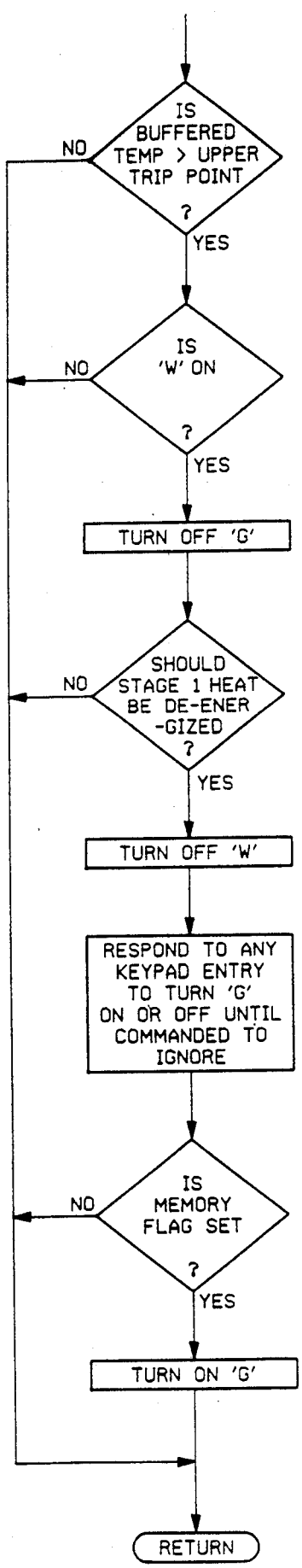

Referring to FIGS. 2A and 2B, illustrated therein is a portion of the temperature algorithm in microcomputer M2 relating to the controlling of the heating portion of apparatus 10. In the temperature algorithm, associated with the set point temperature is a lower trip point which is 3/16° F. above the set point temperature, and an upper trip point which is 12/16° F. above the set point temperature.

The first logic inquiry in FIG. 2A is whether the buffered temperature is less than the lower trip point. If the answer is yes, the next inquiry is whether terminal W is on, that is to say, whether microcomputer M2 has provided an enabling signal to drive circuit 216 to effect closing of relay contacts 218. Hereinafter, for brevity, terminals G, W and Y will be referred to simply as G, W and Y, respectively. Microcomputer M2 effects a demand for heating by causing W to be turned on, that is to say, causing relay contacts 218 to close, whenever the buffered temperature drops 1/16° F. below the lower trip point. Therefore, if W is not already on at this particular logic step, W is turned on. The logic then proceeds to an inquiry as to whether G is on, that is to say, whether microcomputer M2 has provided an enabling signal to gating circuit 214 to effect conduction of triac Q2. It is to be noted that microcomputer M2 can cause G to be on either due to a demand for continuous circulator fan operation or due to a demand for the second stage of heating. It is also to be noted that continuous circulator fan operation can be effected by fan switch 222 being in the ON position or by microcomputer M2 being programmed to cause G to be on due to a demand for continuous circulator fan operation during a specific time period. This latter operation occurs with fan switch 222 being in the AUTO position. This feature of providing for continuous circulator fan operation during a specific time period is sometimes referred to as a programmable fan feature. Hereinafter, continuous circulator fan operation shall include operation due to either fan switch 222 being in the ON position or due to the programmable fan feature. If G is on at this particular logic step, it is on due to a demand for continuous circulator fan operation. To enable G to subsequently provide a signal for second-stage operation in the present heating cycle, G is turned off; to enable a return to continuous circulator fan operation after the present heating cycle is terminated, a memory flag is set prior to turning G off. If G is not on, the memory flag is cleared.

If W is already on, it remains on. Thereafter, microcomputer M2 ignores any keypad entry to turn G on or off until microcomputer M2 executes a command to respond to a keypad entry. That is to say, once W is on, the status of G cannot be changed by an entry on keypad 210.

As will hereinafter be described more completely, with W on and G off, the first stage of the heating portion of apparatus 10 is energized. The next logic inquiry is whether stage two of the heating portion should be energized. In the temperature algorithm, with W on, the count value in the anticipation counter increments and is added to the ambient temperature to define buffered temperature as previously described. If the buffered temperature rises above the lower trip point, the count value will increment to a certain value and then stop incrementing. However, if the buffered temperature stays below or drops below the lower trip point, the counter can continue to increment. When the count value has incremented to a predetermined value, which value can only be achieved if the buffered temperature drops below the lower trip point, microcomputer M2 turns on G, that is to say, it turns on triac Q2. As will hereinafter be described, with G on, the second stage of the heating portion of apparatus 10 is energized.

The logic then proceeds to FIG. 2B wherein the logic inquiry is whether the buffered temperature is greater than the upper trip point. If no, the program goes to RETURN. If yes, the next inquiry is whether W is on. If W is not on, the program goes to RETURN. If W is on, which denotes that the system is definitely in the heating mode, G is turned off thus de-energizing the second stage of heating.

The next inquiry is whether stage one of the heating portion should be de-energized. In the temperature algorithm, the anticipator count begins to decrement when stage two is de-energized and continues to decrement so long as the buffered temperature remains greater than the upper trip point. When the count reaches a predetermined value, microcomputer M2 turns off W, that is to say, it causes relay contacts 218 to open, thus effecting de-energizing of stage one. Microcomputer M2 then executes a command to respond to any keypad entry to turn G on or off until it executes a command to ignore any keypad entry. That is to say, once W is off, the status of G can be changed by an appropriate entry on keypad 210.

The next inquiry is whether the memory flag is set. If yes, G is turned on so as to again allow for continuous operation of circulator fan 50. If no, G remains off.

The logic described in FIGS. 2A and 2B results in signals transmitted to microcomputer M1 of apparatus 10 through wires 18 and 20 and buffer 142. Microcomputer M1 is programmed to respond to such signals. Specifically, referring to FIG. 3, when W turns on, indicating that a call for heat is initiated, microcomputer M1 determines whether G was on 100 milliseconds before W is turned on. If G was on, it was on due to a demand for continuous operation of circulator fan 50. Under this condition, microcomputer M1 causes fan 50 to remain on. If G was not on, microcomputer M1 causes fan 50 to remain off.

Microcomputer M1 then initiates a heat cycle. Microcomputer M2 also executes a command to ignore the status of G until a flame has existed for a specific time period, such as 66 seconds. While the logic for the heat cycle includes many steps, only those steps deemed necessary or helpful to illustrate the present invention will be described. When W initially turns on, microcomputer M1 provides for a pre-purge to purge the combustion chamber of any unburned gas. To effect this function, microcomputer M1 provides an enabling signal to drive circuits 80 and 82 to effect closing of relay contacts 76 and 78 whereby inducer 64 is energized at a high speed.

Microcomputer M1, after pre-purge, provides an enabling signal to drive circuit 204 to effect closing of relay contacts 202 so as to enable energizing of igniter 194. Concurrently, microcomputer M1 effects closing of relay contacts 74 and opening of relay contacts 78 so as to cause inducer 64 to run at a low speed.

After a predetermined time period sufficiently long for igniter 194 to attain ignition temperature, microcomputer M1 provides enabling signals to drive circuits 176 and 178 to effect closing of relay contacts 172 and 174. With contacts 172 and 174 closed, gas valve 158 is energized at its terminals 180 and 184 to effect a low rate of gas flow to the burner. The electrical circuit for this energizing is from one side of secondary winding 118 of transformer T1 through rollout switch 110, through wire 14 to terminal R, through relay contacts 218 to terminal W, through wire 20, through high-limit switch 148 and auxiliary limit switch 150, through low-pressure switch 152, through relay contacts 172 and 174, gas valve 158, and to the other side of secondary winding 118 through chassis common C.

With gas flowing to the burner and with igniter 194 at ignition temperature, a burner flame is established. By means of flame probe 208, microcomputer M1 detects the presence of flame. In response to the presence of flame, microcomputer M1 starts an internal timer to establish an on-delay time period which, when expired, will effect operation of the circulator fan 50 at a desired speed.

After flame has been established for at least 6 seconds, microcomputer M1 starts an internal timer to establish a 60-second time period to enable the heat exchanger of the furnace to warm up. Concurrently, microcomputer M1 effects closing of relay contacts 78 whereby inducer 64 is energized at a high speed. In response to inducer 64 operating at a high speed, the high-pressure switch 154 closes, thereby enabling electrical power to be applied to terminal 156 of gas valve 158. Under this condition, gas flow through gas valve 158 increases to its second-stage value. If the on-delay time period relative to operation of circulation fan 50 should expire during the 60-second time period, fan 50 would be operated at a relatively low speed.

Referring again to FIG. 3, after flame has existed for 66 seconds (the sum of the previously described 6-second and 60-second time periods), microcomputer M1 checks whether G is on. If G is on, microcomputer M1 provides for high heat (stage two heat). In stage two heat, inducer 64 is operated at a high speed so as to cause the high-pressure switch 154 to be closed. With switch 154 closed, gas valve 158 enables the second-stage value of gas flow. If G is not on, microcomputer M1 provides for low heat (stage one heat). In stage one heat, inducer 64 is operated at a low speed so as to cause only low-pressure switch 152 to close (high-pressure switch 154 remains open). With only low-pressure switch 152 closed, gas valve 158 enables the first-stage value of gas flow.

If the on-delay time period relative to operation of circulator fan 50 should expire when the system is operating in stage one heating, microcomputer M1 provides for operating fan 50 at a relatively low speed. If the time period expires when the system is operating in stage two heating, microcomputer M1 provides for operating fan 50 at a relatively high speed. Microcomputer M1 provides such control by providing enabling signals to drive circuit 52.

When the call for heat is terminated, that is to say, when W is no longer on, the program exits as shown in FIG. 3. When W turns off, gas valve 158 is de-energized thereby terminating the flow of gas to the burner. When flame is no longer present, microcomputer M1 provides for operation of inducer 64, preferably at a high speed, for a timed period to remove the products of combustion from the combustion chamber. This particular function is commonly referred to as post-purge. When this timed period expires, inducer 64 is de-energized. When flame is no longer present, microcomputer M1 also provides for operation of circulator fan 50, preferably at a low speed, for a timed period to distribute the heat remaining in the furnace plenum after flame is extinguished. When this timed period expires, fan 50 is de-energized unless there is a demand for continuous fan operation, in which case, fan 50 continues to operate at a speed established by microcomputer M1 for continuous fan operation.

Figure 4A:
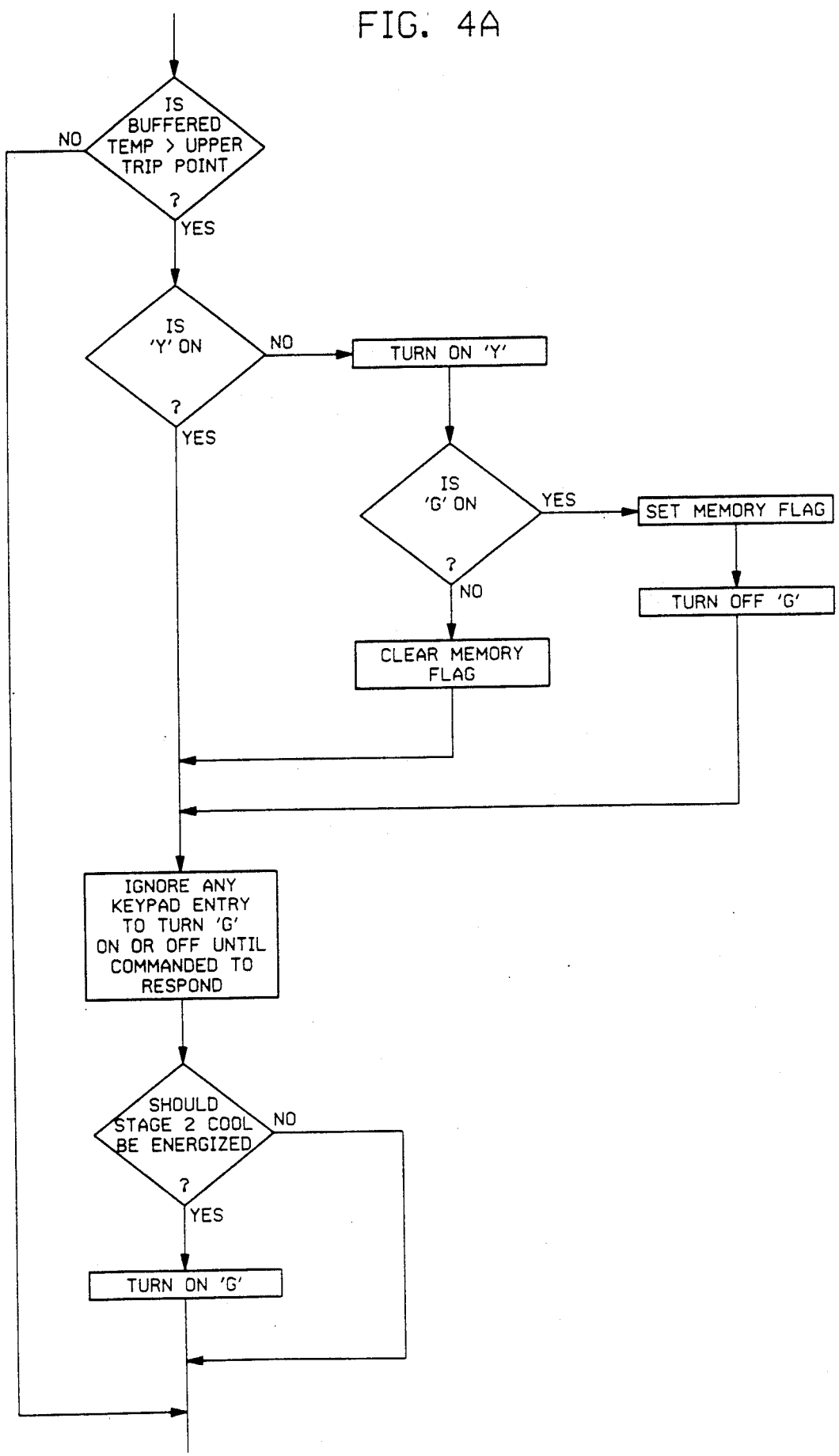
FIGS. 4A and 4B, when combined, is a flow chart depicting logic programmed into and executed by the thermostat of FIG. 1 to effect control of two-stage cooling.
Figure 4B:
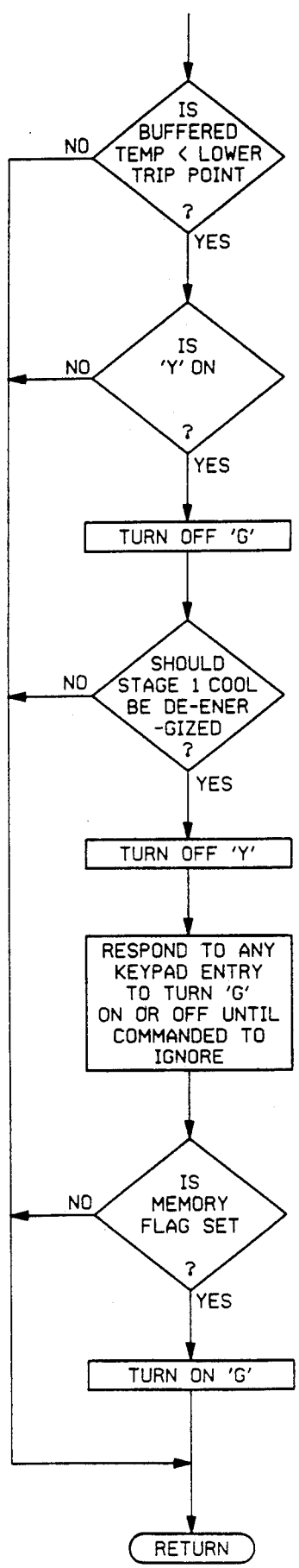

Microcomputer M2 of thermostat 12 is also programmed to control the cooling portion of apparatus 10. Referring to FIGS. 4A and 4B, illustrated therein is a portion of the temperature algorithm in microcomputer M2 relating to such function. In the temperature algorithm, associated with the set point temperature is a lower trip point which is 3/16° F. above the set point temperature, and an upper trip point which is 12/16° F. above the set point temperature.

The first inquiry in FIG. 4A is whether the buffered temperature is greater than the upper trip point. If yes, the next inquiry is whether Y is on, that is to say, whether microcomputer M2 has provided an enabling signal to drive circuit 212 to effect conduction of triac Q1. Microcomputer M2 effects a demand for cooling by causing Y to be turned on, that is to say, causing triac Q1 to conduct, whenever the buffered temperature rises 1/16° F. above the upper trip point. Therefore, if Y is not already on at this particular logic step, Y is turned on and the logic proceeds to an inquiry as to whether G is on. If G is on at this particular logic step, it is on due to a demand for continuous circulator fan operation. To enable G to subsequently provide a signal for second-stage operation in the present cooling cycle, G is turned off; to enable a return to continuous circulator fan operation after the present cooling cycle is terminated, a memory flag is set prior to turning G off. If G is not on, the memory flag is cleared.

If Y is already on, it remains on. Thereafter, microcomputer M2 ignores any keypad entry to turn G on or off until microcomputer M2 executes a command to respond to a keypad entry. That is to say, once Y is on, the status of G cannot be changed by an entry on keypad 210.

As will hereinafter be described more completely, with Y on and G off, the first stage of cooling is energized. The next logic inquiry is whether stage two of the cooling portion should be energized. In the temperature algorithm, with Y on, the count value in the anticipation counter increments and is subtracted from the ambient temperature to define buffered temperature as previously described. If the buffered temperature drops below the upper trip point, the count value will increment to a certain value and then stop incrementing. However, if the buffered temperature stays above or rises above the upper trip point, the counter can continue to increment. When the count has incremented to a predetermined value, which value can only be achieved if the buffered temperature rises above the upper trip point, microcomputer M2 turns on G. As will hereinafter be described, with G on, the second stage of the cooling portion of apparatus 10 is energized.

The logic then proceeds, referring to FIG. 4B, to an inquiry as to whether the buffered temperature is less than the lower trip point. If yes, the next inquiry is whether Y is on. If Y is not on, the program goes to RETURN. If Y is on, which denotes that the system is definitely in the cooling mode, G is turned off thus de-energizing the second stage of cooling.

The next inquiry is whether stage one of the cooling portion should be de-energized. In the temperature algorithm, the anticipator count begins to decrement when stage two is de-energized and continues to decrement so long as the buffered temperature remains less than the lower trip point. When the count reaches a predetermined value, microcomputer M2 turns off Y, that is to say, it causes triac Q1 to turn off, thus effecting de-energizing of stage one. Microcomputer M2 then executes a command to respond to any keypad entry to turn G on or off until it executes a command to ignore any keypad entry. That is to say, once Y is off, the status of G can be changed by an appropriate entry on keypad 210.

The next inquiry is whether the memory flag is set. If yes, G is turned on so as to again allow for continuous operation of circulator fan 50. If no, G remains off.

The logic described in FIGS. 4A and 4B results in signals transmitted to microcomputer M1 of apparatus 10 through wires 16 and 18 and buffer 142. Microcomputer M1 is programmed to respond to such signals. Specifically, referring to FIG. 5, when Y turns on, indicating that a call for cool is initiated, microcomputer M1 determines whether G was on 100 milliseconds before Y turned on. If G was on, it was on due to a demand for continuous operation of circulator fan 50. Under this condition, microcomputer M1 causes fan 50 to remain on. If G was not on, microcomputer M1 causes fan 50 to remain off. Microcomputer M1 then ignores the status of G until a fan-on delay timer has expired.

When Y initially turns on, compressor contactor coil 136 is energized. The electrical circuit for this energizing is from one side of secondary winding 118 of transformer T1 through rollout switch 110, through wire 14 to terminal R, through triac Q1 to terminal Y, and through wire 16 and compressor contactor coil 136 to the other side of secondary winding 118. With coil 136 energized, the compressor (not shown) is energized to effect stage one cooling. Unless circulator fan 50 is on due to a demand for continuous operation of fan 50 when Y initially turns on, fan 50 remains off until the fan-on delay timer has expired.

When the fan-on delay timer expires, microcomputer M1 checks whether G is on. If G is not on, microcomputer M1 provides enabling signals to drive circuit 52 to effect energizing of circulator fan 50 at a relatively low speed. This condition defines low cool (stage one cool). If G is on, microcomputer M1 provides an enabling signal to drive circuit 134 to effect closing of relay contacts 132. With relay contacts 132 closed, shuttle valve 126 is energized. With shuttle valve 126 energized, loading on the compressor is increased thereby causing increased cooling. Concurrent with effecting closing of relay contacts 132, microcomputer M1 also provides enabling signals to drive circuit 52 to effect energizing of circulator fan 50 at a relatively high speed. This condition of shuttle valve 126 being energized and circulator fan 50 operating at high speed defines high cool (stage two cool).

Figure 5:
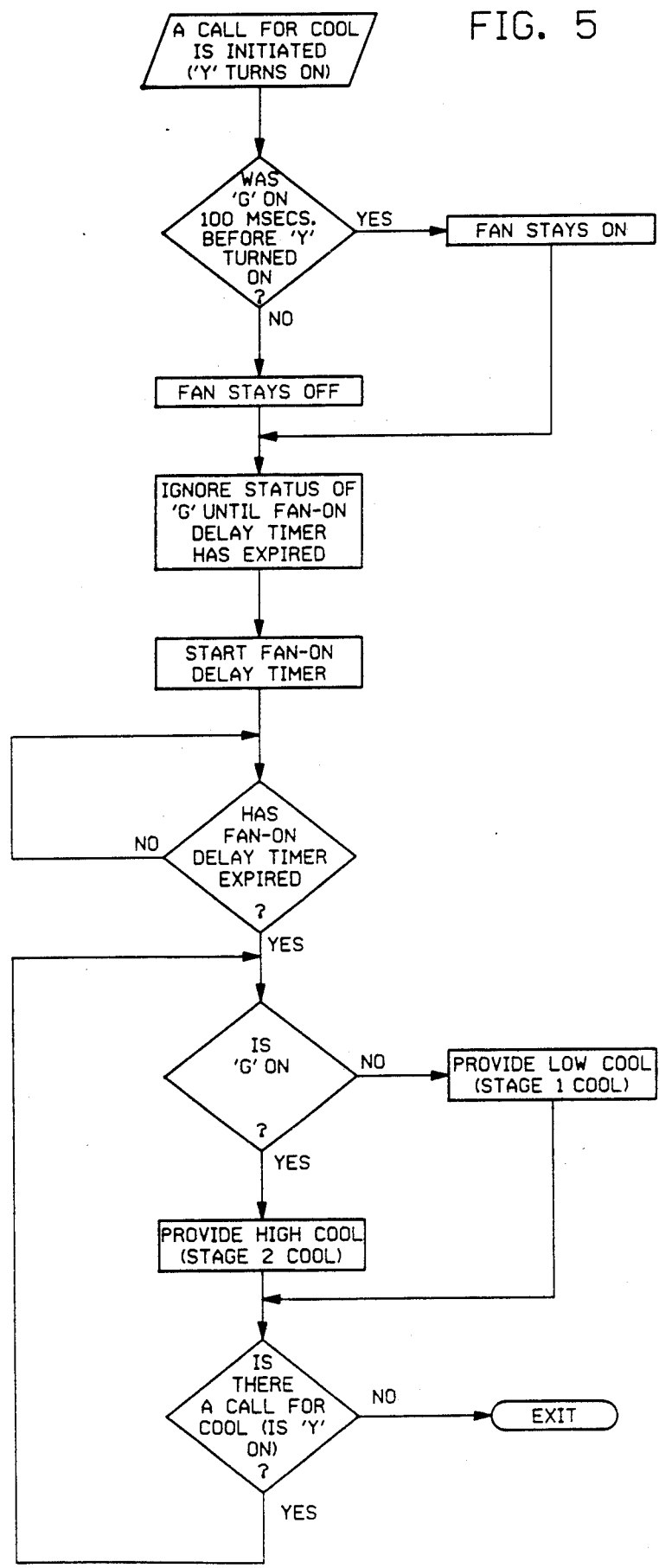
FIG. 5 is a flow chart depicting logic programmed into and executed by the control module in the heating and cooling apparatus of FIG. 1 to effect control of two-stage cooling.

When the call for cool is terminated, that is to say, when Y is no longer on, the program exits as shown in FIG. 5. When Y turns off, compressor contactor coil 136 is de-energized thereby terminating operation of the compressor. Preferably, microcomputer M1 provides enabling signals to drive circuit 52 to effect operation of circulator fan 50 at a low speed for an additional time period provided by a fan-off delay timer so as to distribute the cool air remaining in the furnace plenum (where the cooling coil is located) after the compressor is de-energized. When the fan-off delay timer expires, fan 50 is de-energized unless there is a demand for continuous fan operation, in which case, fan 50 continues to operate at a speed established by microcomputer M1 for continuous fan operation.

DESCRIPTION OF A SECOND EMBODIMENT

In a second embodiment of the present invention, either the heating apparatus is two-stage and the cooling apparatus is single-stage, or the cooling apparatus is two-stage and the heating apparatus is single-stage.

If the heating apparatus is two-stage and the cooling apparatus is single-stage, apparatus 10 would not include shuttle valve 126. Also, preferably, circulator fan 50 would be replaced by a fan which provides at least one less speed selection than is provided in two-stage cooling. Control module 22 and thermostat 12 would be the same as shown in FIG. 1. Since control module 22 and thermostat 12 are the same as shown in FIG. 1, the logic programmed into and executed by microcomputers M1 and M2 also is the same as shown in FIGS. 2A, 2B, 3, 4A, 4B and 5. It is to be noted that in the logic of FIGS. 4A, 4B and 5, which relates to the cooling mode, the turning on and off of G by microcomputer M2 in response to a demand for initiation or termination of stage two cooling would provide no increase or decrease in cooling capacity. This condition exists because shuttle vale 126, which controls stage two cooling in response to G being on or off, is not included in single-stage cooling, and the circulator fan that would preferably be utilized has no unique speed selection activated in response to G being on in response to a logic demand for operation of stage two cooling.

If the cooling apparatus is two-stage and the heating apparatus is single-stage, apparatus 10 would utilize a conventional single-stage gas valve instead of two-stage gas valve 158. Also, low-pressure switch 152 and high-pressure switch 154 would be replaced by a single pressure switch electrically connected in series with relay contacts 172 and 174. Also, preferably, inducer 64 would be replaced by a single-speed inducer. Also, preferably, circulator fan 50 would be replaced by a fan which provides at least one less speed selection than is provided in two-stage heating. Thermostat 12 would be the same as shown in FIG. 1, so that the logic programmed into and executed by microcomputer M2 in thermostat 12 would be the same as shown in FIGS. 2A, 2B, 4A and 4B. The logic in microcomputer M1 in control module 22 relating to heating would be modified to reflect the use of one pressure switch instead of two, and to reflect the use of a single-speed inducer. The logic in microcomputer M1 relating to cooling would remain the same as that previously described for two-stage cooling. In the logic of FIGS. 2A, 2B and 3, which relates to the heating mode, the turning on and off of G by microcomputer M2 in response to a demand for initiation or termination of stage two heating would provide no increase or decrease in heating capacity. This condition exists because the gas valve is a single-stage valve, there is only one pressure switch, the inducer is a single-speed inducer, and the circulator fan has no unique speed selection activated in response to G being on in response to a logic demand for operation of stage two heating.

DESCRIPTION OF A THIRD EMBODIMENT

Figure 6:
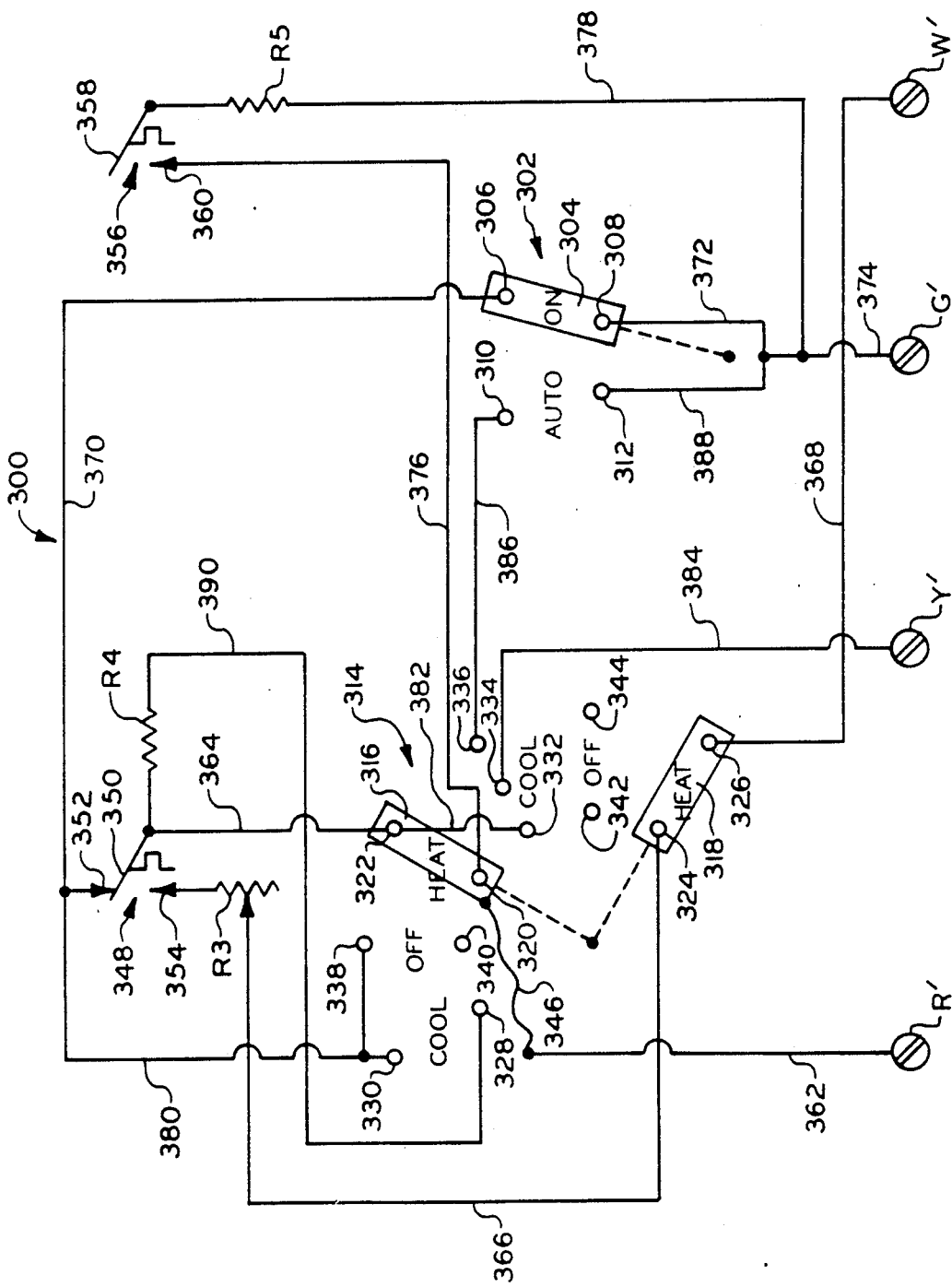
FIG. 6 is a schematic illustration of an electromechanical thermostat utilizing four wires for providing control of two-stage heating and single-stage cooling in accordance with the present invention.

Referring to FIG. 6, shown therein is an electromechanical thermostat 300 for controlling a two-stage heating and single-stage cooling apparatus. In this embodiment, apparatus 10 in FIG. 1 is modified in the manner previously described to provide two-stage heating and single-stage cooling. Thermostat 12 is replaced by thermostat 300 which is adapted to be connected at terminals R', Y', G' and W' to leads 14, 16, 18 and 20, respectively, of FIG. 1.

Thermostat 300 contains a fan switch 302 which includes a shorting bar 304 movable to positions of ON or AUTO. When in the ON position, shorting bar 304 connects terminals 306 and 308; when in the AUTO position, shorting bar 304 connects terminals 310 and 312.

Thermostat 300 also contains a system selector switch 314 for selecting HEAT, COOL, or OFF. Switch 314 includes a pair of shorting bars 316 and 318 which are mechanically linked together so that the bars 316 and 318 are movable together. When switch 314 is in the HEAT position, shown in FIG. 6, shorting bar 316 connects terminals 320 and 322 while shorting bar 318 connects terminals 324 and 326. When switch 314 is in the COOL position, shorting bar 316 connects terminals 328 and 330 while shorting bar 318 connects terminals 332, 334 and 336. When switch 314 is in the OFF position, shorting bar 316 connects terminals 338 and 340 while shorting bar 318 connects terminals 342 and 344. Shorting bar 316 is connected to a flexible lead 346.

Thermostat 300 includes a single-pole, double-throw switch 348 comprising a bimetal-actuated movable member 350 and fixed contacts 352 and 354. Basically, when the sensed temperature is less than the set point temperature, member 350 makes with contact 354; when the sensed temperature is greater than the set point temperature, member 350 makes with contact 352. An adjustable resistor R3 is connected in series with contact 354 and functions as a heating anticipator; a resistor R4 is connected to movable member 350 and functions as a cooling anticipator.

Thermostat 300 further includes a single-pole, single-throw switch 356 comprising a bimetal-actuated movable member 358 and fixed contacts 360. Basically, when the sensed temperature is sufficiently less than the set point temperature, which set point temperature is lower than the set point temperature of switch 348, member 358 makes with contact 360. A resistor R5 is connected to movable member 358 and functions as a heating anticipator.

In operation, thermostat 300 is effective to provide the same control of modified apparatus 10 as is provided by thermostat 12.

In FIG. 6, thermostat 300 is shown with system selector switch 314 in the HEAT position, fan switch 302 in the ON position, member 350 of switch 348 in contact with contact 352, and member 358 of switch 356 separated from contact 360. When the sensed temperature drops below the set point temperature of switch 348, member 350 breaks from contact 352 and makes with contact 354. Under this condition, W' is turned on, the circuit being: R' through a lead 362, flexible lead 346, shorting bar 316 and terminals 320 and 322, a lead 364, member 350, contact 354, resistor R3, a lead 366, shorting bar 318 and contacts 324 and 326, and a lead 368 to W'. W' being on initiates a call for heat.

Referring also to FIG. 3, when W' is turned on, the logic inquiry is whether G' was on 100 milliseconds before W' turned on. With fan switch 302 in the ON position, the answer is yes, the circuit being: R' through lead 362, flexible lead 346, shorting bar 316 and terminals 320 and 322, lead 364, member 350, contact 352, a lead 370, shorting bar 304 and contacts 306 and 308, and leads 372 and 374 to G'. Under this condition, the modified circulator fan of FIG. 1 would remain on. If G' had not been previously on, the circulator fan would have been off and would remain off.

In accordance with the logic of FIG. 3, a heat cycle would then be initiated as previously described, and the status of G' would then be ignored until flame exists for 66 seconds. After flame has existed for 66 seconds, the logic inquiry is whether G' is on. It is noted that after member 350 breaks from contact 352, the only electrical circuit to G' is through switch 356. Therefore, until member 358 makes with contact 360, G' is off and stage one heat is provided.

Switch 356 is calibrated to provide for member 358 making with contact 360 when the sensed temperature has dropped a few degrees below the temperature at which member 350 made with contact 354. When member 358 makes with contact 360, G' is turned on, the circuit being: R' through lead 362, flexible lead 346, shorting bar 316 and terminal 320, a lead 376, contact 360 and member 358, resistor R5, a lead 378, and lead 374 to G'. Under this condition, stage two heating is provided.

When system selector switch 314 is in the COOL position, Y' is turned on when member 350 is in contact with contact 352, the circuit being: R' through lead 362, flexible lead 346, shorting bar 316 and terminals 328 and 330, a lead 380, contact 352 and member 350, lead 364, terminal 322, a lead 382, shorting bar 318 and terminals 332 and 334, and a lead 384 to Y'. If fan switch 302 is in the AUTO position, G' is concurrently turned on, the circuit including shorting bar 318 and terminal 336, a lead 386, shorting bar 304 and terminals 310 and 312, a lead 388, and lead 374 to G'. If fan switch 302 is in the ON position, G' is constantly on, the circuit being: R', lead 362, flexible lead 346, shorting bar 316 and terminals 328 and 330, leads 380 and 370, shorting bar 304 and terminals 306 and 308, and leads 372 and 374 to G'.

It is noted that when there is no call for cooling, that is to say, when member 350 is not in contact with contact 352, there is an electrical circuit to Y' through a lead 390 and resistor R4. If fan switch 302 is in the AUTO position, lead 390 and resistor R4 also enable an electrical circuit to be completed to G'. The circuit to Y' provides the conventional cooling anticipation as is well known in the art. With regard to the circuit to G', it is to be noted that resistor R4 is of such value so as to prevent the signal on G' from being an enabling signal. That is to say, under this condition, the signal on G' is not an indication that G' is on.

An additional feature of the present invention is that if thermostat 12 or 300 should fail, a conventional thermostat normally used for controlling single-stage heating and cooling can be utilized, as a temporary expedient, to enable at least some amount of cooling and heating until a new one of thermostat 12 or 300 can be installed.

Specifically, such a conventional thermostat has a power return terminal, a terminal for controlling the cooling apparatus, a terminal for controlling the circulator fan, and a terminal for controlling the heating apparatus. If such a thermostat were used to temporarily replace thermostat 12 or 300, the power return terminal would be connected to lead 14, the terminal for controlling the cooling apparatus would be connected to lead 16, the terminal for controlling the circulator fan would be connected to lead 18, and the terminal for controlling the heating apparatus would be connected to lead 20. Such a conventional thermostat also includes a fan switch having an ON and AUTO position. When the fan switch is in the ON position, the terminal for controlling the circulator fan is constantly on. When the fan switch is in the AUTO position, the terminal for controlling the circulator fan is on whenever the terminal for controlling the cooling apparatus is on. When the fan switch is in the AUTO position and the thermostat is in the heating mode, the thermostat has no control over the terminal controlling the circulator fan so that the terminal controlling the circulator fan remains off.

In accordance with the logic of FIG. 3, with such a thermostat in the heating mode and with the fan switch in the AUTO position, only stage one of apparatus 10 would be operated because the terminal for controlling the circulator fan (the terminal connected to lead 18) remains off. Under this condition, circulator fan 50 is controlled by microcomputer M1 to run during the heating cycle and to be off when the demand for heating is satisfied. With the fan switch in the ON position, stage two of apparatus 10 would be operated as soon as flame has existed for 66 seconds because the terminal for controlling the circulator fan is constantly on. Also, under this condition, circulator fan 50 is constantly on.

In accordance with the logic of FIG. 5, with such a thermostat in the cooling mode and with the fan switch in the AUTO position, stage two of the cooling apparatus would be operated as soon as the fan-on delay timer expires because the terminal for controlling the circulator fan (the terminal connected to lead 18) is on whenever cooling is called for. Except for previously-described off delays, circulator fan 50 is off when the call for cooling is satisfied. With the fan switch in the ON position, stage two of the cooling apparatus would be operated as soon as the fan-on delay timer expires because the terminal for controlling the circulator fan is constantly on. Also under this condition, circulator fan 50 is constantly on.

It should be apparent, without further description, that such a conventional thermostat would also be effective to enable at least some amount of heating and cooling if apparatus 10 were modified as in the previously described second embodiment wherein one of the heating and cooling apparatus is single-stage and the other is two-stage.

While the invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

I claim:

1. In a system for controlling heating and cooling apparatus wherein the heating and cooling apparatus include a circulator fan and wherein at least one of the heating and cooling apparatus is two-stage, a control module in said heating and cooling apparatus;

a thermostat;

fan control means in said thermostat for selectively effecting a demand or no demand for continuous operation of said circulator fan; and means for directly connecting said thermostat to said control module consisting of four wires, a first one of said wires being effective to provide a common power connection between said thermostat and said control module, a second one of said wires being effective to provide an enabling signal to said control module to control first-stage operation of said heating apparatus, a third one of said wires being effective to provide an enabling signal to said control module to control first-stage operation of said cooling apparatus, a fourth one of said wires being effective to provide, in response to said fan control means, an enabling signal to said control module to control operation of said circulator fan, and also to provide an enabling signal to said control module to control second-stage operation of said two-stage apparatus.

2. In a system for controlling heating and cooling apparatus wherein the heating and cooling appparatus include a circulator fan and wherein at least one of the heating and cooling apparatus is two-stage, a control module in said heating and cooling apparatus;

an electronic thermostat; and means for directly connecting said thermostat to said control module consisting of four wires, a first one of said wires being effective to provide a common power connection between said thermostat and said control module, a second one of said wires being effective to provide a first signal to said control module to control first-stage operation of said heating apparatus, a third one of said wires being effective to provide a second signal to said control module to control first-stage operation of said cooling apparatus, said thermostat including a microcomputer which provides means for establishing, on a fourth one of said wires, a third signal indicative of a demand for continuous operation of said circulator fan and a fourth signal indicative of a demand for second-stage operation of said two-stage apparatus, said control module including a microcomputer which is responsive to said third and fourth signals to control, respectively, operation of said circulator fan and second-stage operation of said two-stage apparatus.

3. In a system for controlling heating and cooling apparatus wherein the heating and cooling apparatus include a circulator fan and wherein at least one of the heating and cooling apparatus is two-stage, a control module in said heating and cooling apparatus;

an electronic thermostat; and means for directly connecting said thermostat to said control module consisting of four wires, a first one of said wires being effective to provide a common power connection between said thermostat and said control module, a second one of said wires being effective to provide a first signal to said control module, a third one of said wires being effective to provide a second signal to said control module, a fourth one of said wires being effective to provide a third and a fourth signal to said control module, said thermostat including a microcomputer which provides (a) a temperature algorithm which provides for initiation and termination of a call for energizing of said heating and cooling apparatus by comparing a buffered temperature with lower and upper trip points associated with a set point temperature, said buffered temperature being a composite value including a component based on sensed temperature and a component based on a characteristic related to demand for operation of said heating and cooling apparatus, (b) means for establishing, in the absence of said call for energizing and if continuous operation of said circulator fan is to be effected, said third signal on said fourth one of said wires indicative of a demand for continuous operation of said circulator fan, (c) means, responsive to said comparing of said buffered temperature, for terminating said third signal and for establishing said first signal on said second one of said wires or said second signal on said third one of said wires indicative of a demand for first-stage operation of said two-stage apparatus, (d) means, response to a predetermined value of said component of said buffered temperature based on a characteristic related to demand for operation, for providing said fourth signal on said fourth one of said wires indicative of a demand for second-stage operation of said two-stage apparatus.

4. The system claimed in claim 3 wherein said microcomputer further provides means for re-establishing, after said call for energizing is terminated, said third signal indicative of a demand for continuous operation of said circulator fan.

5. The system claimed in claim 3 wherein said control module includes a microcomputer which provides means responsive to said fourth signal on said fourth one of said wires to control operation of said circulator fan and second-stage operation of said two-stage apparatus.

6. In a system for controlling heating and cooling apparatus wherein the heating and cooling apparatus include a circulator fan and wherein at least one of the heating and cooling apparatus is two-stage, a control module in said heating and cooling apparatus;

a thermostat;

a fan switch in said thermostat for selectively effecting a demand or no demand for continuous operation of said circulator fan; and means for directly connecting said thermostat to said control module consisting of four wires, a first one of said wires being effective to provide a common power connection between said thermostat and said control module, a second one of said wires being effective to provide a first signal to said control module to control first-stage operation of said heating apparatus, a third one of said wires being effective to provide a second signal to said control module to control first-stage operation of said cooling apparatus.

said control module including a microcomputer which provides means, responsive to a third and a fourth signal from said thermostat on a fourth one of said wires, for controlling, respectively, operation of said circulator fan and second-stage operation of said two-stage apparatus, said thermostat being effective to provide said third signal in response to said demand for continuous operation of said circulator fan effected by said fan switch, and to provide said fourth signal in response to a demand for second-stage operation of said two-stage apparatus effected by temperature responsive means in said thermostat.

* * * * *